United States Patent [19]

Palmer

[11] 3,922,171

[45] Nov. 25, 1975

[54] CORRECTING AGENT FOR PHOTOMECHANICALLY PRODUCED PRINTING

[75] Inventor: Roland Palmer, Wiesbaden-Klarenthal, Germany

[73] Assignee: Hoechst Aktiengesellschaft, Germany

[22] Filed: Dec. 27, 1973

[21] Appl. No.: 428,756

[30] Foreign Application Priority Data

Dec. 29, 1972 Germany ............................ 2263957

[52] U.S. Cl. .................... 106/23; 106/19; 106/311; 117/2 R; 117/2 TC

[51] Int. Cl.$^2$ .......................................... C09D 11/02

[58] Field of Search ......... 106/19, 20, 23, 311, 287; 117/2 R, 2 T; 96/5–9; 134/38

[56] References Cited

FOREIGN PATENTS OR APPLICATIONS 1,272,868 5/1972 United Kingdom .................... 106/23

OTHER PUBLICATIONS

Rose, The Condensed Chemical Dictionary, 7th ed., N.Y. Van Nostrand Reinhold Co., 1966 p. 330 "Dimethyl Sulfoxide".

*Primary Examiner*—Theodore Morris
*Attorney, Agent, or Firm*—James E. Bryan

[57] ABSTRACT

This invention relates to a correcting agent for photomechanically produced printing forms consisting essentially of 10 to 30 per cent by weight of 2-methoxyethanol or 2-ethoxyethanol, or a mixture of both; 10 to 30 per cent by weight of methyl isobutyl ketone, ethyl isobutyl ketone, or 2,4-dimethyl pentanone(-3), or a mixture of two or all of these ketones; 5 to 20 per cent by weight of dimethyl sulfoxide; 10 to 20 per cent by weight of benzyl alcohol; 10 to 20 per-cent by weight of phosphoric acid (85%, rest water); 0 to 7 per cent by weight of water (in addition to the water contained in the 85% phosphoric acid solution); 0 to 10 per cent by weight of glycerol; 0 to 20 per cent by weight of finely divided silica, and 0 to 0.1 per cent by weight of a dyestuff.

2 Claims, No Drawings

CORRECTING AGENT FOR PHOTOMECHANICALLY PRODUCED PRINTING

This invention relates to an agent for correcting printing forms that have been produced by a photomechanical process.

It is known to prepare printing forms by photomechanical means. For this purpose, light-sensitive printing plates are used comprising a support, i.e. the carrier for the copying layer, and a light-sensitive copying layer thereon on which an image is produced by image-wise exposure under an original and development of the exposed layer. This image serves as the printing image of the printing form thus obtained.

The light-sensitive layer may be of the bichromate/-gelatin type. A so-called presentizied material, i.e. a material which can be stored for a long time in the sensitized state without losing in quality, normally contains diazo compounds, azido compounds, or photopolymerizable compounds as the light-sensitive substances in the reproduction layer. The correcting agent according to the present invention is particularly suitable for correcting offset printing forms prepared from presensitized printing plates.

Means are known which may be used for correcting defects occurring in photomechanically prepared printing forms. Such defects may be caused by faults already contained in the original used for exposure of the light-sensitive printing plates, or they may be caused during exposure, in that edges of originals, mounting aids, or dust and dirt particles, e.g., are reproduced, or they may consist of fingerprints or other impurities. The present invention deals with an agent for removing these and similar faults which can be removed by correcting agents.

It is not easy to prepare suitable correcting agents because they must meet several requirements. Thus, the correcting agent must be not only capable of removing the printing image on the printing plate, but it must also rapidly and completely dissolve the printing ink applied to the image. It must not, however, spread beyond the areas to which it has originally been applied. Moreover, the correcting agent must be so safe physiologically, that it can be used on the correcting table without having to take protective measures.

German Offenlegungsschrift No. 1,817,416, as well as the corresponding US and British publications, i.e. copending U.S. patent application Ser. No. 888,928 filed Dec. 29, 1969, and British Patent Specification No. 1,272,868, describe correcting agents for printing forms which consist of a glycol, another neutral solvent, water, an acid substance and a diluting medium, and which, additionally, may contain a dyestuff. The correcting agents described in these publications, however, still have some disadvantages, and it is the object of the present invention to overcome these disadvantages.

The correcting agent according to the present invention consists essentially of 10 to 30 per cent by weight of 2-methoxyethanol or 2-ethoxyethanol, or a mixture of both,
10 to 30 per cent by weight of methylisobutyl ketone, ethyl isobutyl ketone, or 2,4-dimethylpentanone (-3), or a mixture of two or all of these ketones,
5 to 20 per cent by weight of dimethyl sulfoxide,
10 to 20 per cent by weight of benzyl alcohol, 10 to 20 per cent by weight of phosphoric acid (85%, rest water),
0 to 7 per cent by weight of water (in addition to the water contained in the 85% phosphoric acid solution),
0 to 10 per cent by weight of glycerol,
0 to 20 per cent by weight of finely divided silica, and
0 to 0.1 per cent by weight of a dyestuff.

The solvents contained in the correcting agent according to the invention mainly serve different purposes. Thus, methoxyethanol and ethoxyethanol (also called methyl glycol and ethyl glycol) substantially act as transporting agents, i.e. more or less as diluting media for mitigating the solvent power of the other solvents present, whereas the ketones have the task of dissolving the area of the printing image which is to be removed, and dimethyl sulfoxide and benzyl alcohol dissolve the printing ink.

The incorporation of additional water (in addition to the water contained in the 85% phosphoric acid solution) is mainly provided in those cases in which it is desired to accelerate the effect of the correcting agent; further, it may serve to stabilize the miscibility of the various components with each other. If such an additional water component is incorporated, the additional quantity of water contained in the correcting agent is normally at least 3 per cent by weight. Preferably, distilled or deionized water is used.

Glycerol is added to the correcting agent in order to soften it, so that it may be spread more easily on the desired areas of the printing plate, using, e.g., a fine hair brush. If the addition of glycerol is deemed desirable, the quantity of glycerol added amounts normally to at least 1 per cent by weight of the correcting agent.

In most cases, 5 to 20 per cent by weight of finely divided silica are incorporated in the correcting agent according to the invention, in order to impart to it the desired pasty consistency. A correcting agent containing no finely divided silica incorporated therein may be of advantage in such cases where the areas to be removed during correction are very small.

Normally, it will not be advisable to omit the dyestuff component. In most cases, the correcting agent contains at least 0.001 per cent by weight of dyestuff. Indicator dyestuffs showing deep colors in the acid range, especially blue or violet color shades, are preferred.

On the basis of the preceding statements on the substantial effects of each of the individual components of the correcting agent according to the invention, the appropriate composition of a correcting agent to be used in a particular case may be easily formulated. In the following, some examples are given. The percentages stated are by weight.

| | | |
|---|---|---|
| Example 1 | | |
| | 15.5% | of phosphoric acid (85%) |
| | 15.5% | of methylglycol or ethyl glycol |
| | 17.5% | of methyl isobutyl ketone |
| | 8.5% | of dimethyl sulfoxide |
| | 17.5% | of benzyl alcohol |
| | 3.5% | of water (deionized) |
| | 7.0% | of glycerol |
| | 15.0% | of finely divided silica (type D 17, marketed by Degussa, Frankfurt/M., Germany) |
| | 0.001% | of alkali blue |
| Example 2 | | |
| | 13.0% | of phosphoric acid (85%) |
| | 26.0% | of methyl or ethyl glycol |
| | 13.0% | of methyl isobutyl ketone |
| | 13.0% | of dimethyl sulfoxide |

-continued

| | | |
|---|---|---|
| | 13.0% | of benzyl alcohol |
| | 6.5% | of deionized water |
| | 15.5% | of silica (type D 17, Degussa) |
| | 0.004% | of alkali blue |
| Example 3 | | |
| | 16.0% | of phosphoric acid (85%) |
| | 20.0% | of methyl or ethyl glycol |
| | 14.0% | of methyl isobutyl ketone |
| | 10.0% | of dimethyl sulfoxide |
| | 10.0% | of benzyl alcohol |
| | 5.0% | of deionized water |
| | 10.0% | of glycerol |
| | 15.0% | of silica (type D 17, Degussa) |
| | 0.002% | of benzo purpurin |
| Example 4 | | |
| | 18.0% | of phosphoric acid (85%) |
| | 22.0% | of methyl or ethyl glycol |
| | 15.0% | of methyl isobutyl ketone |
| | 8.0% | of dimethyl sulfoxide |
| | 12.0% | of benzyl alcohol |
| | 8.0% | of glycerol |
| | 17.0% | of sililca (type D 17, Degussa) |

The correcting agent according to the invention may be used for printing forms of various types. For instance, it works equally well on printing forms prepared from printing plate material that has been presensitized with o-naphthoquinone diazide sulfonic acid esters or amides and comprises an etchable aluminum or zinc plate as the support, as it works with printing forms prepared from a material having a cinnamic acid esterified polyvinyl alcohol as the reproduction layer. A further example of printing forms for which the correcting agent of the invention is suitable are printing forms prepared from printing plate material which had been presensitized with iminoquinone diazides.

When the correcting agents described in the preceding examples were used for correcting an offset printing form prepared from a light-sensitive reproduction material that had been presensitized with an o-naphthoquinone diazide sulfonic acid ester and whose support consisted of brushed or anodized aluminum, the correcting agent — which was applied by means of a brush to the areas to be removed — was allowed to act for about 30 seconds in the case of the brushed aluminum support and for about 60 seconds in the case of the anodized support, and in each case the support was then thoroughly rinsed with water. The image areas treated with the correcting agent disappeared completely. The correcting agents according to the invention have some advantages over known correcting agents of a similar mode of action:

They dry more slowly, so that they can be spread a longer time after being taken from the container and can be rinsed off with water a longer time after their application. Their tendency to act outside the area to which they are applied is even less marked, and they are substantially less objectionable from the physiological point of view.

It will be obvious to those skilled in the art that many modifications may be made within the scope of the present invention without departing from the spirit thereof, and the invention includes all such modifications.

What is claimed is:

1. A correcting agent for photomechanically produced printing forms consisting essentially of 10 to 30 per cent by weight of 2-methoxyethanol or 2-ethoxyethanol, or a mixture of both, 10 to 30 per cent by weight of methyl isobutyl ketone, ethyl isobutyl ketone, or 2,4-dimethyl pentanone (-3), or a mixture of two or all of these ketones, 5 to 20 per cent by weight of dimethyl sulfoxide, 10 to 20 per cent by weight of benzyl alcohol, 10 to 20 per cent by weight of phosphoric acid containing 15 per cent by weight of water, 0 to 7 per cent by weight of water, in addition to the water contained in the 85 per cent phosphoric acid, 0 to 10 per cent by weight of glycerol, 0 to 20 per cent by weight of finely divided silica, and 0 to 0.1 per cent by weight of a dyestuff.

2. A correcting agent as claimed in claim 1, which contains 3 to 8 per cent by weight of water in addition to the water contained in the phosphoric acid, 1 to 10 per cent by weight of glycerol, 5 to 20 per cent by weight of finely divided silica, and 0.001 to 0.1 per cent by weight of a dyestuff.

* * * * *